Patented Mar. 27, 1934

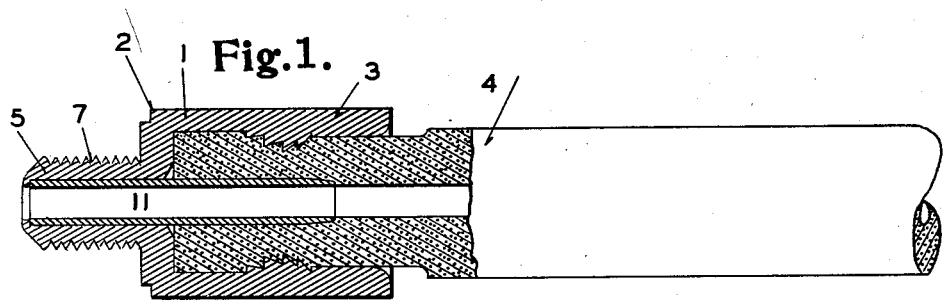
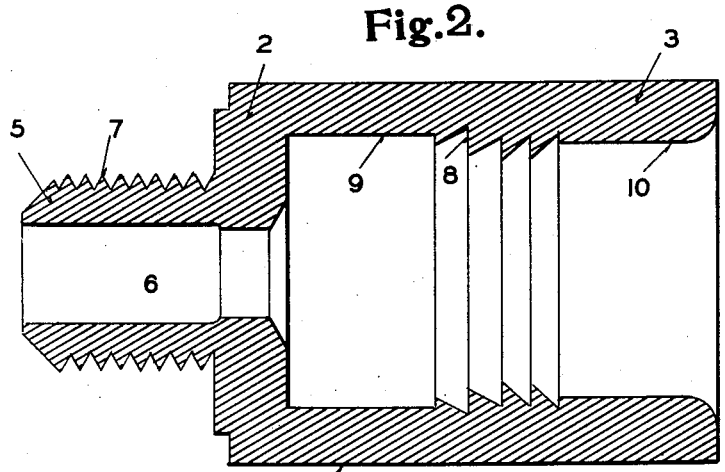
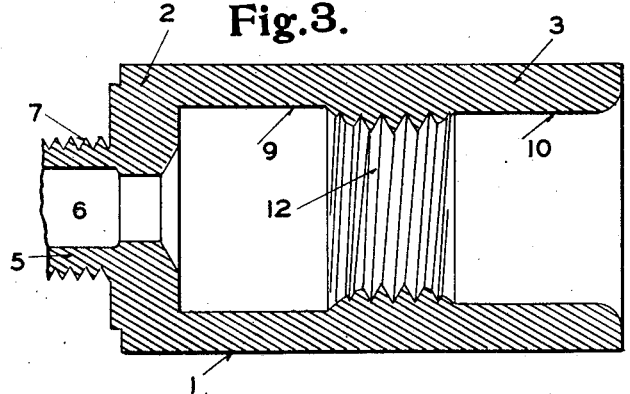

1,952,416

UNITED STATES PATENT OFFICE 1,952,416

HOSE FITTING

Albert Brunner, St. Louis, Mo., assignor to Wagner Electric Corporation, St. Louis, Mo., a corporation of Delaware Application February 26, 1932, Serial No. 595,253

2 Claims. (Cl. 29—88.2)

My invention relates to a fitting or coupling member to be secured to the end of a hose embodying rubber or other compressible material, and to the method of securing it to the hose, the object of the invention being to form a simple connection between a hose and a fitting member which will be not only mechanically secure but also fluid-tight under very high pressure, and which will require a minimum number of steps in assembly, thereby making it very economical to manufacture.

Other objects of my invention will become apparent from the following description taken in connection with the accompanying drawing in which Figure 1 is a cross sectional view of the hose and the fitting in their assembled position; Figure 2 is an enlarged cross sectional view of the body portion of the fitting member; and Figure 3 is a cross sectional view of a modified form.

Referring to Figures 1 and 2, the numeral 1 indicates the fitting member which comprises the wrench receiving main body portion 2 and the tubular extension 3 surrounding the end of the hose 4. The outer end of the fitting has formed integral therewith a second extension 5 provided with a nipple receiving bore 6 and external threads 7 for cooperation with an internally threaded socket. The tubular extension 3 is provided, at its central portion, with internal serrations 8 which project toward the forward end of the fitting. The internal diameter of the portions 9 and 10 of the extension 3 on each side of the serrations is greater than the internal diameter of any of the circumferential projections forming the serrated portions. The portions 9 and 10 are also of slightly greater diameter than the normal external diameter of the hose end and although they may be of the same diameter, I prefer to have the portion 9 of slightly greater diameter than the portion 10. The open end of the extension 3 is slightly flared and, since the portion 10 does not compress the hose, repeated bending of the hose at the fitting does not cause it to break.

The nipple 11 is formed of a plain tubular member and extends into the bore of the hose to a point beyond the serrated portion but not as far as the end of the extension 3. The portion of the nipple carried by the body portion 2 of the fitting has a press fit therewith, whereas the portion lying in the threaded extension 5 has a clearance fit with the extension, this condition being secured by having the inner end of the bore 6 of slightly smaller diameter than the remainder, as shown in Figure 2. The internal diameter of the nipple is the same as the bore of the hose 4 before insertion in the extension 3. After insertion of the hose in the extension 3, the bore of the hose is reduced adjacent the serrations 8. The diameter of the hose bore after the nipple has been inserted is increased an amount equal to twice the thickness of the nipple, as shown in Figure 1. The inner end of the nipple is also slightly tapered and rounded to facilitate in its insertion. To hold the nipple in its assembled position, the outer end of the extension 5 is peened over as shown.

In assembling the hose fitting, the end of the hose is first ground to the proper external diameter, which is greater than the internal diameter of the projections forming the serrated portion 8 and slightly less than the internal diameter of the extension portion 10. The end of the hose is next inserted into the extension 3, past the serrations, and tightly against the body portion 2 of the fitting. The only part of the hose that is now in contact with the extension 3, is the portion adjacent the serrations, since the other portions of the extension are of larger diameter than the external diameter of the hose. The nipple 11 of proper length, is next dropped into the outer portion of the bore 9 of the extension 5 and then pushed into the bore of the hose by a suitable tool. The end of the extension 5 is then peened over to insure the nipple being held in place and to also assist the press-fitted portion in making a fluid-tight seal between the nipple and the fitting. The action of the nipple in entering the bore of the hose, causes the end of the hose to expand and completely fit the portion 9 of the extension 3 and to compress the hose between the serrated portion and the nipple, causing the projections to "bite" into the hose.

In Figure 3 of the drawing I have disclosed a fitting which differs from the one just described in the type of projections used, the projection 8 being replaced by threads 12. These threads are formed in the inwardly extending curved surface on the interior wall of the tubular extension 3 by means of a uniform diameter tap, thereby producing more shallow threads adjacent the portion 10 than at the central portion of the curved surface. This construction is very advantageous in facilitating the insertion of the hose into the fitting as the end of the hose may be readily screwed into the tubular extension by spinning the fitting in a chuck and pushing the end of the hose into the extension to engage the threads. The threaded relation insures that the end of the hose will be forced tightly against the body of the fitting.

It is readily seen from the above described constructions that I have produced a very simple hose terminal that requires neither compressing of the initially formed extension of the fitting, nor expansion of the nipple after insertion, thereby avoiding the cost of each operation commonly employed in prior types of fittings. Tests have also shown that the force necessary to separate the fitting and the hose is greater than that required in other types known to me. Due to the fact that there is also little or no pressure between the open end of the extension of the fitting and the hose, the stresses due to the bending of the hose adjacent the fitting are well distributed and the possibility of cracking is reduced to a minimum. Due to the expanding of the hose by the nipple, the press fit between the nipple and the fitting, and the peening of the fitting over the end of the nipple, there is also no possibility of leakage between the hose fitting and the nipple.

Having fully described my invention, what I claim as new and desire to secure by Letters Patent of the United States is:

1. The method of assembling and securing a connector in fluid-tight relation with the end of a hose of flexible material, said connector being provided with a tubular extension for receiving the end of the hose the bore of which is provided with a portion having a diameter substantially smaller than the normal external diameter of the hose and spaced a substantial distance from the inner end of the extension and the portion forwardly thereof having a diameter greater than the normal diameter of the hose, which comprises forcing the hose end into said extension whereby the hose will be contracted only adjacent the portion of the extension of reduced diameter, and then inserting into the bore of the hose a cylindrical nipple of larger diameter than said bore and to a point beyond the reduced portion of the extension to thereby expand the hose and tightly compress the hose material between said nipple and the portion of reduced diameter, and to cause the hose to completely fill the portion of the extension forwardly of the reduced portion.

2. The method of assembling and securing a connector in fluid-tight relation with the end of a hose of flexible material, said connector being provided with a tubular extension, the medial portion of its bore being of substantially smaller diameter than the normal external diameter of the hose and the remaining portion thereof which forms the major portion of the extension being of greater diameter than the normal external diameter of the hose, which comprises forcing the hose end into said extension whereby the hose will be contracted only adjacent the medial portion of the extension and then inserting into the bore of the hose a cylindrical nipple of larger diameter than said bore and to a point beyond the medial portion of the extension to expand the bore of the hose and tightly compress the hose material between said nipple and said medial portion of the extension and to cause the hose to completely fill the portion of the extension forwardly of the medial portion.

ALBERT BRUNNER.